US012239274B2

(12) United States Patent
Calvimontes et al.

(10) Patent No.: US 12,239,274 B2
(45) Date of Patent: Mar. 4, 2025

(54) SYSTEM COMPRISING A DISHWASHER AND METHOD FOR OPERATING A DISHWASHER

(71) Applicant: BSH Hausgeräte GmbH, Munich (DE)

(72) Inventors: Alfredo Calvimontes, Dillingen a. d. Donau (DE); Philipp Neumaier, Berlin (DE)

(73) Assignee: BSH Hausgeräte GmbH, Munich (DE)

( * ) Notice: Subject to any disclaimer, the term of this patent is extended or adjusted under 35 U.S.C. 154(b) by 253 days.

(21) Appl. No.: 17/924,130

(22) PCT Filed: May 19, 2021

(86) PCT No.: PCT/EP2021/063278
§ 371 (c)(1),
(2) Date: Nov. 9, 2022

(87) PCT Pub. No.: WO2021/239537
PCT Pub. Date: Dec. 2, 2021

(65) Prior Publication Data
US 2023/0172423 A1  Jun. 8, 2023

(30) Foreign Application Priority Data
May 25, 2020  (DE) .......................... 102020206488.1

(51) Int. Cl.
*A47L 15/42* (2006.01)
*A47L 15/00* (2006.01)
(Continued)

(52) U.S. Cl.
CPC ....... *A47L 15/4295* (2013.01); *A47L 15/0028* (2013.01); *A47L 15/0063* (2013.01);
(Continued)

(58) Field of Classification Search
CPC ............. A47L 15/4295; A47L 15/0063; A47L 15/0021; A47L 15/0028; A47L 2401/30;
(Continued)

(56) References Cited

U.S. PATENT DOCUMENTS 10,517,458 B2 * 12/2019 Wilson .................. A47L 15/507
11,484,183 B2 * 11/2022 Boyer ................. A47L 15/4295
(Continued)

FOREIGN PATENT DOCUMENTS

DE  19961782 A1  6/2001
DE  10048081 A1  4/2002
(Continued)

OTHER PUBLICATIONS

Machine Translation of DE 10048081 A1 to Bertram et al., Sep. 2000. (Year: 2000).*
(Continued)

*Primary Examiner* — Benjamin L Osterhout
(74) *Attorney, Agent, or Firm* — Michael E. Tschupp; Andre Pallapies; Brandon G. Braun

(57) ABSTRACT

A system includes a dishwasher, an image capturing device designed to capture an image of washware arranged in the washing chamber, with the image including a plurality of sub-images, each of which having different spectral information of the washware. An illumination unit illuminates the washware in the washing chamber, and an image analysis unit receives the captured image from the image capturing device and to carry out a chemical analysis of soiling on the washware based on the plurality of sub-images of the received image and to ascertain a dirt characteristic of soiling as a result of the chemical analysis. A control device carries out a washing program for washing the washware in the washing chamber. The control device receives the dirt characteristic from the image analysis unit and adapts the
(Continued)

washing program for washing the washware as a function of the received dirt characteristic.

20 Claims, 5 Drawing Sheets

(51) Int. Cl.
| | | |
|---|---|---|
| *G01J 3/42* | (2006.01) | |
| *G06T 7/11* | (2017.01) | |
| *G06V 10/141* | (2022.01) | |
| *G06V 10/143* | (2022.01) | |
| *G01J 3/10* | (2006.01) | |
| *G01J 3/32* | (2006.01) | |
| *G01N 21/31* | (2006.01) | |
| *G01N 21/88* | (2006.01) | |
| *G01N 21/94* | (2006.01) | |

(52) U.S. Cl.
CPC ............... *G01J 3/42* (2013.01); *G06T 7/11* (2017.01); *G06V 10/141* (2022.01); *G06V 10/143* (2022.01); *A47L 15/0021* (2013.01); *A47L 15/0047* (2013.01); *A47L 2401/023* (2013.01); *A47L 2401/04* (2013.01); *A47L 2401/30* (2013.01); *A47L 2501/07* (2013.01); *A47L 2501/30* (2013.01); *G01J 3/10* (2013.01); *G01J 3/32* (2013.01); *G01N 21/31* (2013.01); *G01N 21/8851* (2013.01); *G01N 2021/8854* (2013.01); *G01N 2021/8887* (2013.01); *G01N 21/94* (2013.01); *G01N 2021/945* (2013.01); *G01N 2201/0627* (2013.01); *G06T 2207/20021* (2013.01)

(58) Field of Classification Search
CPC ............. A47L 2401/04; A47L 2501/07; A47L 15/0047; A47L 2501/30; A47L 2401/023; G01J 3/32; G01J 3/10; G01J 3/42; G01N 21/94; G01N 21/8851; G01N 21/31; G01N 2021/8854; G01N 2201/0627; G01N 2021/8887; G01N 2021/945; G06V 10/141; G06V 10/143; G06T 7/11; G06T 2207/20021

See application file for complete search history.

(56) References Cited

U.S. PATENT DOCUMENTS

| | | | |
|---|---|---|---|
| 11,490,779 B2 * | 11/2022 | Digman | ................ A47L 15/23 |
| 2013/0229646 A1 | 9/2013 | Sakurai | |
| 2013/0258314 A1 | 10/2013 | Gomi | |
| 2018/0156725 A1 | 6/2018 | Kessler | |
| 2019/0244375 A1 | 8/2019 | Choi | |
| 2019/0380559 A1 * | 12/2019 | Lee | ....................... G06N 20/00 |
| 2020/0063323 A1 | 2/2020 | Kessler | |
| 2020/0178755 A1 | 6/2020 | Terrádez Alemany | |

FOREIGN PATENT DOCUMENTS

| | | |
|---|---|---|
| DE | 102015209984 B3 | 10/2016 |
| DE | 102016106430 A1 | 11/2016 |
| DE | 102016212976 A1 | 1/2018 |
| EP | 1116471 A2 | 7/2001 |
| EP | 3168602 A1 | 5/2017 |
| JP | 2018031598 A | 3/2018 |
| NL | 1041809 A | 4/2017 |
| WO | 2019015990 A1 | 1/2019 |

OTHER PUBLICATIONS

International Search Report PCT/EP2021/063278 dated Aug. 20, 2021.
National Search Report DE 102020206488.1 dated Sep. 27, 2021.

* cited by examiner

SYSTEM COMPRISING A DISHWASHER AND METHOD FOR OPERATING A DISHWASHER

CROSS-REFERENCES TO RELATED APPLICATIONS

This application is the U.S. National Stage of International Application No. PCT/EP2021/063278, filed May 19, 2021, which designated the United States and has been published as International Publication No. WO 2021/239537 A1 and which claims the priority of German Patent Application, Serial No. 10 2020 206 488.1, filed May 25, 2020, pursuant to 35 U.S.C. 119 (a)-(d).

The contents of International Application No. PCT/EP2021/063278 and German Patent Application, Serial No. 10 2020 206 488.1 are incorporated herein by reference in their entireties as if fully set forth herein.

BACKGROUND OF THE INVENTION

The present invention relates to a system comprising a dishwasher and a method for operating a dishwasher.

The cleaning performance of a dishwasher depends, amongst other things, on the correct washing program and the correct detergent being selected for a specific type and quantity of soiling. Thus it is desirable that the degree of soiling is known as accurately as possible in order to optimize the washing program accordingly.

DE 10 2015 209 984 A1 discloses a device and a method for determining the dirt load in a washing liquor in a water-conducting household appliance, for example in a dishwasher. In this case, near infrared spectroscopy is used to determine specifically the type and quantity of the dirt load in the washing liquor.

BRIEF SUMMARY OF THE INVENTION

Against this background, an object of the present invention is to improve further the operation of a dishwasher.

According to a first aspect, a system is proposed comprising a dishwasher, preferably a household dishwasher, comprising a control device for carrying out a washing program for washing washware which can be arranged in a washing chamber, comprising an image capturing device for capturing an image of washware arranged in the washing chamber, wherein the image comprises a plurality of sub-images, each thereof having different spectral information on the washware, with an illumination unit for illuminating the washware arranged in the washing chamber, with an image analysis unit which is designed to receive the captured image from the image capturing device and to carry out a chemical analysis of soiling of the washware on the basis of the plurality of sub-images of the received image and to ascertain a dirt characteristic of the soiling as a result of the chemical analysis. The control device is designed to receive the dirt characteristic and adapt the washing program for washing the washware as a function of the received dirt characteristic.

The proposed system has the advantage that an individually adapted washing program is ascertained by the control device on the basis of the dirt actually present on the washware. Thus, on the one hand, the cleaning performance of the dishwasher can be improved and, on the other hand, an efficiency of the dishwasher is increased. This is because, in particular, a water quantity, an energy quantity, a detergent type and a detergent quantity which are used for carrying out the washing program can be optimally set on the basis of the dirt present.

The control device can be implemented in terms of hardware technology and/or software technology. In the case of an implementation in terms of hardware technology, the control device can be configured, for example, as a computer or as a microprocessor. In the case of an implementation in terms of software technology, the control device can be configured as a computer program product, as a function, as a routine, as part of a program code or as an executable object.

The image capturing device is configured, for example, as a digital image sensor such as a CCD (charge-coupled-device) or a CMOS (complementary metal-oxide-semiconductor) which has a plurality of image points, also called pixels. For example, the image sensor comprises at least 1 MP (MP=megapixel), preferably at least 5 MP, further preferably more than 8 MP. The greater the number of pixels, the better the spatial resolution of the image sensor.

The image capturing device captures the image of the washware, such that this image comprises a plurality of sub-images which in each case have different spectral information on the washware. An example thereof is an RGB image (RGB: red-green-blue), in which a sub-image which can be extracted from the image is captured or generated for each of the color channels. It can also be said that the image capturing device outputs a plurality of images, in each case with different spectral information as a data set. The image capturing device can also output the sub-images individually, wherein one respective sub-image thus contains, for example, information which identifies it as a sub-image of an image, such that the sub-images forming part of an image can be identified.

The image captured by the image capturing device can also be denoted as a hyperspectral image.

The image capturing device is arranged such that it can "see" the interior of the washing container, i.e. that an image field or image angle of the image capturing device at least partially encompasses the interior of the washing container. For example, the image capturing device is arranged in the washing container or in a corresponding recess with a window into the washing container. Thus the washware which is arranged in the washing chamber is (at least partially) visible on the captured image and thus also the dirt adhering to the washware.

The illumination unit is designed for illuminating the washware, wherein the illumination unit illuminates the washware, in particular, when the image or the plurality of sub-images is/are captured by the image capturing device.

The image analysis unit receives the captured image from the image capturing device and carries out a chemical analysis of a soiling of the washware. To this end, for example, the image analysis unit analyses each of the plurality of sub-images of the received image individually and/or in correlation with at least one other of the plurality of sub-images. "Analyzing" in the present case is understood to mean, in particular, the application of image processing algorithms and/or carrying out image transformations on one respective sub-image. The image analysis unit is designed, in particular, to limit the chemical analysis selectively to individual image regions. For example, the image analysis unit carries out an object recognition in order to ascertain the image regions which are relevant for the chemical analysis. For example, the image analysis unit identifies by means of the object recognition where washware is visible in the image and where, for example, an internal wall of the washing chamber can be seen.

The image analysis unit can be implemented in terms of hardware technology and/or software technology. In the case of an implementation in terms of hardware technology, the image analysis unit can be configured, for example, as a computer or as a microprocessor. In the case of an implementation in terms of software technology, the image analysis unit can be configured as a computer program product, as a function, as a routine, as part of a program code or as an executable object. The image analysis unit can also be a component of the control device of the dishwasher.

"A chemical analysis" in the present case is understood to mean that, for example, a chemical composition or a chemical component of the soiling is ascertained on the basis of the captured image, provided this soiling is visible on the image. The chemical analysis in the present case is based, in particular, on a spectral analysis. Different chemical substances or molecules have, for example, different absorption bands. An absorption band is a spectral range in which the substance has an increased absorption. The sharper an absorption band, i.e. the narrower and higher the absorption band, the better it is suited to a chemical analysis. "Narrow" refers, for example, to the full width at half maximum of the band, also called the FWHM value (full width at half maximum value), wherein for example a full width at half maximum of 100 nm or below is denoted as narrow. "High" refers, for example, to the maximum absorption of the band, which is specified as a percentage value, wherein 100% means a complete absorption (i.e. no signal, also called the black point) and 0% means a complete reflection (i.e. maximum signal, also called the white point) of the incident light.

Carbohydrates such as starch or sugar have, for example, absorption bands ranging from 800-900 nm. If an item of washware is heavily soiled with starch, then the soiled regions appear dark in an image which is limited to a spectral range of 800-900 nm. Thus a chemical analysis can be carried out, for example, on the basis of the image brightness for a respective spectral range. Preferably, an ascertained average brightness can be compared with reference values which have been ascertained, for example, in a laboratory under strict control of a composition of the soiling.

The dirt characteristic contains the result of the chemical analysis. In particular, the dirt characteristic comprises a number of categories, wherein one respective category represents, for example, a substance or a substance class, such as for example proteins, lipids, carbohydrates, dyes, moisture, carbonized food residues, and the like. Color information can also serve to ascertain the original food, such as for example carrots, beetroot, coffee, tea, cherries, etc., whereby the washing program can be adapted even more accurately. Thus this dirt characteristic can also be considerably more specific than the categories specified above.

The dirt characteristic contains, for example, percentage information relative to one respective substance. If a differentiation is made between the substances which include proteins, lipids and carbohydrates, for example, an exemplary dirt characteristic can comprise the information 20% protein, 30% lipids, 35% carbohydrates and 15% indeterminate, wherein the "indeterminate" category can refer, in particular, to those analyzed image regions which could not be assigned to one of the categories.

The washing program can be optimally adapted or set on the basis of the dirt characteristic. It can also be said that the control device ascertains an optimized washing program. In other words, for example, washing program parameters are ascertained once again and correspondingly set as a function of the dirt characteristic for each washing program cycle. Washing program parameters comprise, in particular, a running time of a sub-program step, a washing liquor temperature for one respective sub-program step or a point in time during the washing program cycle, a washing liquor quantity for one respective sub-program step, a detergent quantity and a detergent composition and metering times of the detergent, a pump speed and the like. A sub-program step is, for example, a prewash, a main wash, rinsing with rinse aid and drying. Moreover, further sub-programs can be provided. The washing program can also be considered as a whole without being subdivided into sub-program steps, wherein for example a time period since a start time of the washing program can then serve as a reference variable. Thus, for example, a washing liquor quantity curve and a temperature curve for the washing liquor can be ascertained for each point in time of the planned washing program cycle. The optimized washing program ascertained in this manner thus has a very high degree of flexibility.

Moreover, the image can be captured and the chemical analysis undertaken repeatedly when carrying out the washing program. Thus, for example, after the main wash it can be ascertained whether soiling is still present on the washware and, if so, what is the type of soiling. The control device can accordingly adapt the further washing program.

The captured image can also be used for ascertaining the loading state of the dishwasher.

According to one embodiment, the image capturing device has a digital image sensor with a spectral sensitivity ranging from 360 nm-980 nm, preferably ranging from 300 nm-1200 nm.

The wider the spectral sensitivity of the sensor, the more spectral information can be captured, which permits a more accurate chemical analysis and differentiation of the soiling.

In the case of semiconductor sensors, in particular, the spectral sensitivity depends on the band gap thereof. For example, only photons whose energy is greater than the band gap can be detected (the energy of a photon is reciprocally proportional to the wavelength). Such an image sensor is based, for example, on silicon, indium, gallium, arsenic, germanium, phosphorous. In particular, so-called III-V semiconductors (these comprise one element from the third main group and one element from the fifth main group of the periodic table) such as InAs (indium arsenide), InP (indium phosphide), GaAs (gallium arsenide) or GaP (gallium phosphide) have different band gaps which can be used in a targeted manner for detecting photons of different energies.

The image sensor can also comprise, in particular, a plurality of semiconductor layers arranged one above the other, with in each case a different band gap.

According to a further embodiment, the illumination unit is designed to emit selectively an emission spectrum from a plurality of different emission spectra.

The "emission spectrum" in the present case is understood to mean, in particular, the spectral energy distribution of the emitted light. For example, sodium vapor lamps have a very narrow emission spectrum at 589 nm, since this light is produced by electronic transitions which have a very precise energy difference within the electron shell of sodium.

One respective emission spectrum is preferably narrowband, i.e. for example narrower than 100 nm FWHM, preferably narrower than 50 nm FWHM, preferably narrower than 25 nm FWHM, preferably narrower than 10 nm FWHM, further preferably narrower than 5 nm FWHM.

A narrow-band emission spectrum can be generated, in particular, by an electronic transition (such as in the case of sodium vapor lamps).

One respective sub-image corresponds, for example, to an image which has been recorded when the illumination unit emitted one of the emission spectra for illuminating the washware. For example, the different emission spectra are passed through in succession and in each case a sub-image is captured. In this manner, the image is captured with the plurality of sub-images.

In embodiments, the illumination unit is designed to emit exactly one of the emission spectra at a point in time. In further embodiments, the illumination unit is designed to emit at least two of the plurality of emission spectra at the same time.

In embodiments, a plurality of illumination units which illuminate different regions in the washing chamber and/or which are designed to emit different emission spectra are provided.

According to a further embodiment, the illumination unit comprises a number of light-emitting diodes with in each case a different emission spectrum.

Light-emitting diodes preferably emit a narrow-band emission spectrum. The intensity of the emitted spectrum can be varied, for example, by the control voltage which can also be advantageously utilized. Additionally, the plurality of different light-emitting diodes can be controlled at the same time so that a mixed color of the emitted light is generated. In this manner, the emission spectrum emitted by the illumination unit can be tuned relative to a resulting color. In this case, a control voltage can also be selected differently for different light-emitting diodes.

According to a further embodiment, the illumination unit and/or the image capturing device has one or more different filters which in each case is or are permeable only to a specific, preferably narrow, spectral range.

The filter can be an absorption filter or even an interference filter. In particular, an interference filter can be designed to allow a narrow-band signal to pass through, for example less than 30 nm FWHM at more than 90% maximum transmission, which is why it can also be referred to as a narrow-band filter.

The image capturing device can have, for example, different filters which in each case are arranged fixedly in front of a number of pixels, or which can be pivoted-in. Moreover, the image capturing device can have a micro-optics system, such as a micro-lens array comprising different filters in order to conduct filtered light in a targeted manner onto individual pixels. In this embodiment, the illumination unit can emit, for example, a continuous spectrum since the sub-images with the different spectral information are generated by the filters of the image capturing device.

The narrower the band of an emission spectrum, the higher the contrast relative to an absorption band which is in the range of the emission spectrum, which improves the assignment of soiling to a chemical substance.

According to a further embodiment, the illumination unit is designed to emit at least five, preferably seven, preferably eight, further preferably nine, different emission spectra, wherein one respective emission spectrum comprises a single maximum.

Preferably, one respective emission spectrum is narrow-band, for example less than 50 nm FWHM. An emission spectrum comprising only a single maximum is understood to mean, in particular, that an intensity of the emitted spectrum ranging between 400 nm-1200 nm, preferably up to 3500 nm, at a distance from the maximum outside two full width at half maximum points, is less than 25% relative to the maximum intensity. Preferably, the emission spectrum has no secondary maximum.

For example, for generating the different emission spectra the illumination unit comprises, in each case, a light-emitting diode with a corresponding emission characteristic. In this case, filters can also be provided in order to achieve a narrow-band emission spectrum.

According to a further embodiment, the image capturing device has an optical device, in particular a wide-angle lens.

This has the advantage that the image capturing device can capture a larger region of the washing chamber. The optical device can be configured in the form of a micro-optics system. The optical device is preferably produced from plastic and can serve at the same time as protection for the sensor. The image analysis unit is designed to carry out an image transformation by considering the optical properties of the optical device, for example a rectification of the image. In this manner, for example when ascertaining an average brightness, it is ensured that each image region is equally weighted, so that a comparison with a reference value provides a correct result.

According to a further embodiment, an optical element which is designed to distribute the light emitted by the illumination unit spatially in the washing chamber is provided.

By means of the optical element, for example, a uniform illumination of the washing chamber can be achieved by the illumination unit so that shadows, for example due to washware, are reduced.

According to a further embodiment, the optical element comprises a lens, a light guide and/or a mirror.

In particular, the emitted light can be deflected and emitted to a different point in the washing chamber by means of a light guide. In this manner, for example, a light distribution can be achieved which otherwise might only be possible with a plurality of illumination units. Additionally, the illumination unit can itself be arranged at any location, such as for example in a machine housing of the dishwasher, wherein the emitted light is conducted by light guides into the washing chamber.

It can be provided that a washing chamber wall has a reflective coating so that it serves as a mirror. In this case, the washing chamber wall can be shaped at least in some portions in a concave or convex manner in order to achieve a targeted deflection of the incident light.

According to a further embodiment, a modulation device is provided, said modulation device being designed to control the illumination unit with an amplitude-modulated control signal, wherein the image capturing device comprises a carrier frequency amplifier for capturing one respective sub-image as a function of the control signal.

The carrier frequency amplifier can also be denoted as a lock-in amplifier. In this embodiment, a signal-noise ratio of the image and/or the sub-images can be improved. In particular, a noise, which for example comes from a 50 Hz network voltage, can be masked out in this manner.

According to a further embodiment, a reference device for providing a reference surface is arranged in the washing chamber, wherein one respective sub-image is calibrated as a function of an intensity of the light reflected by the reference surface.

The reference device can also be denoted as a white standard. The reference device is preferably configured such that it reflects the light of the different spectral ranges, which form the basis of the sub-images, at 100%, at least at 90%. To this end, the reference device can have a plurality of different surfaces which in each case serve as a white standard for a specific spectral range. The intensity reflected by the reference device can then be used for standardizing the intensity of the sub-images. Instead of calibrating, this can also be referred to as calibration or standardizing.

According to a further embodiment, an external device which comprises the image analysis unit is provided, wherein the dishwasher and the external device in each case have a communication unit for bidirectional communication.

The external device, for example, is a server or a computer. This has the advantage that a very high computing power is available for carrying out the chemical analysis.

The communication takes place, for example, via a network, such as a LAN or WLAN, the Internet or a mobile radio network. The communication unit is designed to produce the connection with the respective other communication unit. In this case, a plurality of technologies can be used and a plurality of third-party devices can be present as intermediaries for the connection. For example, the communication unit of the dishwasher produces a connection by means of a WLAN to a router, which establishes a mobile radio connection in the Internet to the server.

In embodiments, the dishwasher has an image analysis unit, and a server which has an additional image analysis unit is additionally provided. In this embodiment, for example, the user can decide whether the image analysis is to be carried out locally or whether the image is to be sent for analysis to the server. Additionally, in the case of connection problems in which the communication connection is interrupted, for example, the image analysis takes place locally and, in the case of an existing communication connection, on the server.

According to a further embodiment, the dirt characteristic comprises information about fats, proteins, carbohydrates, pigments, moisture and/or surface-active substances contained in the soiling.

Surface-active substances can also be denoted as surfactants. For example, detergents comprise such substances.

According to a further embodiment, the control device is designed to ascertain an optimized detergent mixture as a function of the received dirt characteristic. The system has an automatic metering system which is designed to provide the optimized detergent mixture and to meter the optimized detergent mixture into a washing liquor used for washing the washware, wherein the detergent mixture comprises liquid and/or solid components, wherein the detergent mixture comprises an enzyme component, a surfactant component, a bleach component, a soap component, a rinse aid component, and the like.

This is particularly advantageous since, on the basis of the dirt characteristic, the optimized detergent mixture can have a targeted composition which has the most effective action on the soiling. Thus the use of detergent can be reduced since only those components which are actually required, and only in the quantity which is actually required, are supplied to the washing liquor. On the one hand, this saves resources and, on the other hand, this protects the environment.

For example, fats can be effectively cleaned by surfactants. For example, natural dyes and pigments can be effectively cleaned by bleaches. The enzyme component comprises, for example, protease which permits an effective cleaning in the case of proteins and/or amylase which permits an effective cleaning in the case of carbohydrates.

According to a second aspect, a method is proposed for operating a dishwasher, preferably a household dishwasher, comprising a control device for carrying out a washing program for washing washware which can be arranged in a washing chamber. In a first step, washware which is arranged in the washing chamber is illuminated. In a second step, an image is captured of the washware which is arranged in the washing chamber and which is illuminated, wherein the image comprises a plurality of sub-images, each thereof having different spectral information on the washware. In a third step, at least one sub-image of the captured image is analyzed, wherein the analysis comprises carrying out a chemical analysis of a soiling of the washware. In a fourth step, a dirt characteristic of the soiling is ascertained on the basis of the chemical analysis. In a fifth step, the washing program for washing the washware is adapted as a function of the ascertained dirt characteristic.

This method has the same advantages as the above-described system. The embodiments and features described relative to the proposed system accordingly apply to the proposed method.

The proposed method steps are preferably repeatedly carried out when carrying out a washing program, wherein the washing program is optimized each time once again as a function of the current dirt characteristic ascertained.

Moreover, a computer program product is proposed, said computer program product comprising commands which, when the program is executed by a computer, cause this computer to execute the above-described method.

A computer program product, such as for example a computer program means, can be provided or delivered for example as a storage medium, such as for example a memory card, USB stick, CD-ROM, DVD or also in the form of downloadable file from a server in a network. This can be carried out, for example, in wireless communication network by the transmission of a corresponding file by the computer program product or the computer program means.

Further possible implementations of the invention also include not explicitly mentioned combinations of features or embodiments described above or below relative to the exemplary embodiments. In this case, the person skilled in the art will also add individual aspects as improvements or additions to the respective basic form of the invention.

BRIEF DESCRIPTION OF THE DRAWINGS

Further advantageous embodiments and aspects of the invention form the subject matter of the subclaims and the exemplary embodiments of the invention described below. The invention is described in more detail hereinafter by way of preferred embodiments with reference to the accompanying figures.

DETAILED DESCRIPTION OF EXEMPLARY EMBODIMENTS OF THE PRESENT INVENTION

Figure 1:
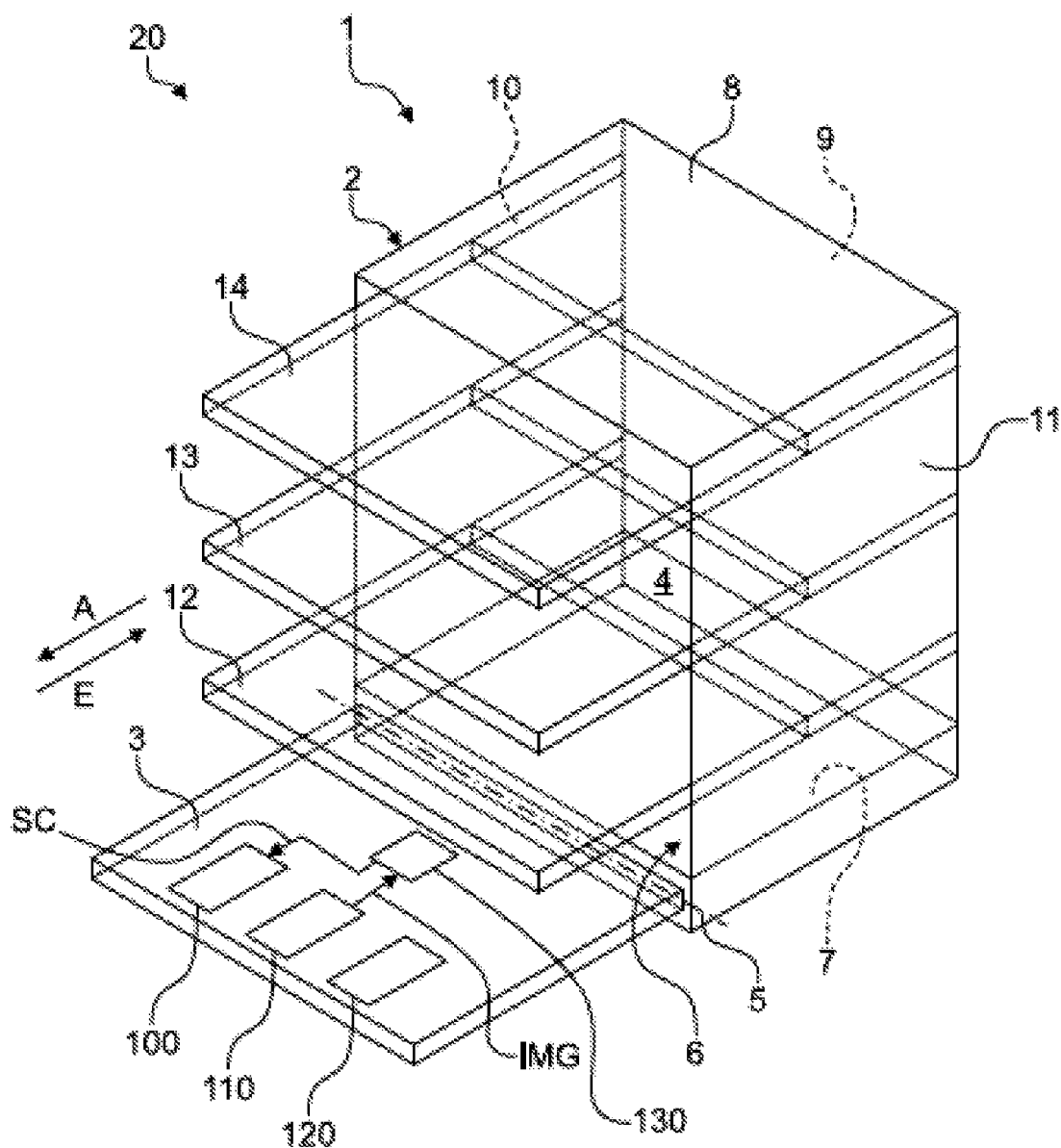
FIG. 1 shows a schematic perspective view of an embodiment of a system comprising a dishwasher.

Elements which are the same or functionally the same have been provided in the figures with the same reference characters unless specified otherwise.

FIG. 1 shows a schematic perspective view of an embodiment of a system 20 comprising a dishwasher 1 which is configured here as a household dishwasher. The household dishwasher 1 comprises a washing container 2 which can be closed by a door 3, in particular in a water-tight manner. To this end, a sealing device can be provided between the door 3 and the washing container 2. The washing container 2 is preferably cuboidal. The washing container 2 can be arranged in a housing of the household dishwasher 1. The washing container 2 and the door 3 can form a washing chamber 4 for washing washware.

The door 3 is shown in FIG. 1 in the open position thereof. The door 3 can be closed or opened by pivoting about a pivot axis 5 provided at a lower end of the door 3. A loading opening 6 of the washing container 2 can be closed or opened by means of the door 3. The washing container 2 has a bottom 7, a ceiling 8 arranged opposite the bottom 7, a rear wall 9 arranged opposite the closed door 3 and two side walls 10, 11 arranged opposite one another. The bottom 7, the ceiling 8, the rear wall 9 and the side walls 10, 11 can be produced, for example, from a stainless steel sheet. The bottom 7 can be produced alternatively from a plastic material, for example.

The household dishwasher 1 also has at least one washware receptacle 12 to 14. Preferably, a plurality of washware receptacles 12 to 14, for example three thereof, can be provided, wherein the washware receptacle 12 can be a lower washware receptacle or a lower basket, the washware receptacle 13 can be an upper washware receptacle or an upper basket, and the washware receptacle 14 can be a cutlery drawer. As FIG. 1 also shows, the washware receptacles 12 to 14 are arranged one above the other in the washing container 2. Each washware receptacle 12 to 14 can be displaced selectively into or out of the washing container 2. In particular, each washware receptacle 12 to 14 can be pushed into or moved into the washing container 2 in a push-in direction E and pulled out or moved out of the washing container 2 in a pull-out direction A counter to the push-in direction E.

A control device 100, an image capturing device 110, an illumination unit 120 and an image analysis unit 130 are shown on the door 3 of the household dishwasher 1. The control device 100 is designed to carry out a washing program for washing washware which can be arranged in the washing chamber 4. The image capturing device 110 is designed to capture an image IMG of washware which is arranged in the washing chamber 4. The image IMG comprises a plurality of sub-images IMG1-IMG6 (see FIG. 3), each thereof having different spectral information on the washware. The illumination unit 120 is designed to illuminate the washware, whilst the image capturing device 110 captures the image IMG. The image analysis unit 130 is designed to receive the captured image IMG from the image capturing device 110 and on the basis of the plurality of sub-images IMG1-IMG6 of the received image IMG to carry out a chemical analysis of a soiling of the washware and as a result of the chemical analysis to ascertain a dirt characteristic SC. The control device 100 is designed to receive the dirt characteristic SC and to adapt the washing program for washing the washware as a function of the received dirt characteristic SC.

Figure 2:
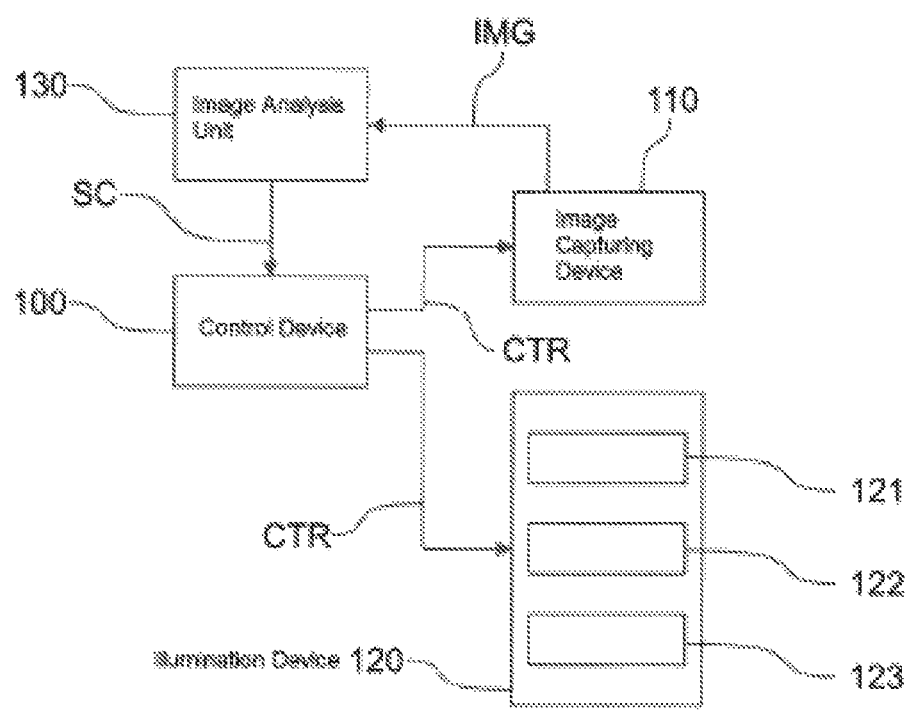
FIG. 2 shows a schematic block diagram.

FIG. 2 shows a schematic block diagram with a control device 100, an image capturing device 110, an illumination unit 120 and an image analysis unit 130. The arrangement of FIG. 2 can be used, for example, in the system of FIG. 1. In this example, the control device 100 controls the image capturing device 110 and the illumination unit 120 by means of corresponding control signals CTR.

The image capturing device 110 comprises in this case a digital image sensor with a spectral sensitivity ranging from 300-1050 nm. The illumination unit 120 in this case has three different light-emitting diodes 121, 122, 123 which are designed in each case to emit different emission spectra. To this end, the illumination unit 120 can also have one or more filters (not shown). For capturing the image IMG, the control device 100 controls the illumination unit 120, for example, such that it emits a first emission spectrum by means of the light-emitting diode 121 and controls the digital image sensor in a chronologically synchronized manner such that it captures a sub-image IMG1 (see FIG. 3) which is temporarily stored, for example, in a buffer memory. "Chronologically synchronized" means, for example, that the image sensor 110 records the sub-image IMG1, whilst the illumination unit 120 emits the emission spectrum. After the first sub-image IMG1 is recorded, the same process is carried out by controlling the further light-emitting diodes 122, 123 so that at least two further sub-images IMG2, IMG3 are captured. It is also possible that a plurality of light-emitting diodes 121, 122, 123 are controlled at the same time, in order to obtain mixed illumination which can contribute to the spectral information as a further sub-image.

The captured sub-images IMG1, IMG2, IMG3 are output as one image IMG to the image analysis unit 130. This leads to a chemical analysis of the soiling of the washware on the basis of the image IMG. The image analysis unit 130 preferably ascertains in advance the image regions which are relevant for the chemical analysis. For example, the image analysis unit 130 identifies which of the image pixels show the washware and which do not. In this case, the image analysis unit 130 carries out, for example, an edge detection of the image and detects specific shapes such as round edges which can originate from plates. The chemical analysis can then be limited to the relevant pixels which permits an improved analysis result.

For example, proteins are particularly easy to identify on the first sub-image IMG1, since this sub-image IMG1 has been recorded with an emission spectrum which is highly absorbed by proteins. Thus dark regions in the sub-image IMG1 correspond to a high protein concentration. For example, it is possible to ascertain an average brightness of the first sub-image IMG1 which represents an indicator of the quantity of proteins in the soiling on the washware. Apart from the average brightness, various other metrics can also be used, which can also permit a more accurate determination.

Accordingly, the further sub-images IMG1-IMG6 are analyzed and the analysis result is output to the control device 100 as the dirt characteristic SC. The dirt characteristic SC contains, for example, relative and/or quantitative information on a chemical composition of the soiling of the washware and/or a quantity of soiling. The dirt characteristic SC is ascertained, for example, in the from of a table and preferably also comprises ascertained uncertainties for individual numerical values.

The control device 100 then ascertains an optimized washing program on the basis of the received dirt characteristic SC.

This method is preferably carried out repeatedly during a washing program cycle, for example after the prewash, after the main wash, after the rinsing with rinse aid and after the drying. As a function of the respectively ascertained dirt characteristic SC, it is then possible to extend the respective step or to pass to the next step. Additionally, individual parameter settings can be further adapted for the following steps and the washing program optimized in this manner.

The image capture or even the chemical analysis can be selectively limited in this case to specific spectral ranges or chemical compositions. For example, only those spectral ranges which can provide an indication of moisture are captured as sub-images and/or analyzed during the drying.

Figure 3:
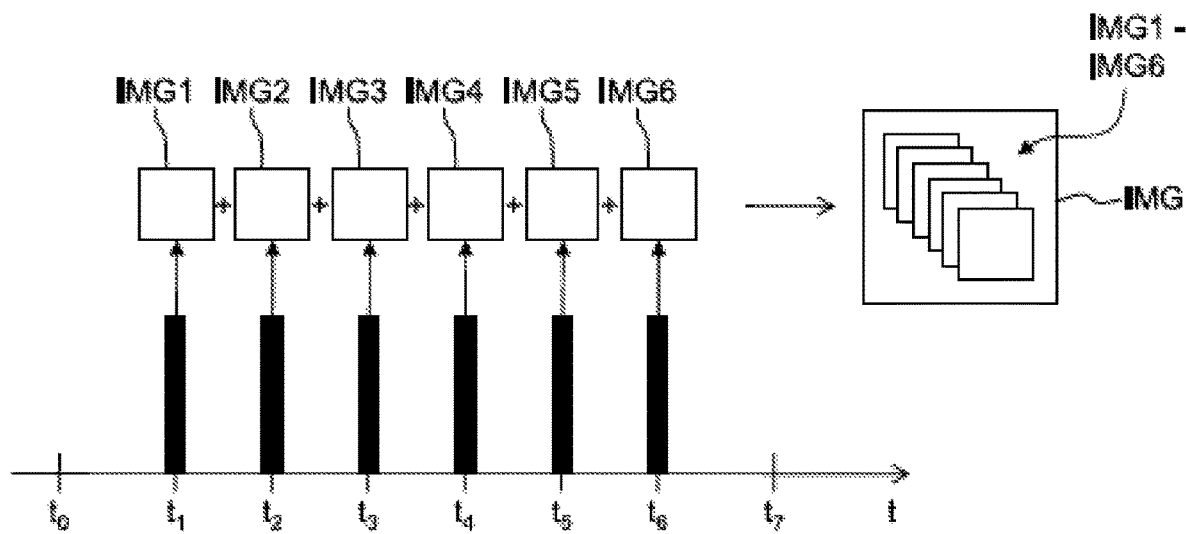
FIG. 3 shows a diagram of an exemplary sequence for capturing an image comprising a plurality of sub-images.

FIG. 3 shows a diagram of an exemplary sequence for capturing an image IMG comprising a plurality of sub-images IMG1-IMG6, which is also denoted hereinafter as the capturing routine. At a point in time t0, the image capturing routine starts. At the points in time t1-t6, in each case a sub-image IMG1-IMG6 is captured, as described for example with reference to FIG. 2. Each of the sub-images IMG1-IMG6 contains different spectral information. After all of the sub-images IMG1-IMG6 have been captured, these sub-images are combined to form one image IMG without the respective spectral information being lost. The different sub-images IMG1-IMG6 are output as one image IMG. At the point in time t7, the routine is terminated. This routine can be carried out any number of times during a washing program cycle.

It should be mentioned that the image IMG does not necessarily always comprise the same number of sub-images IMG1-IMG6. Thus when the described capturing routine is carried out subsequently, only some of the sub-images IMG1-IMG6 can be captured and output as the image IMG.

Figure 4:
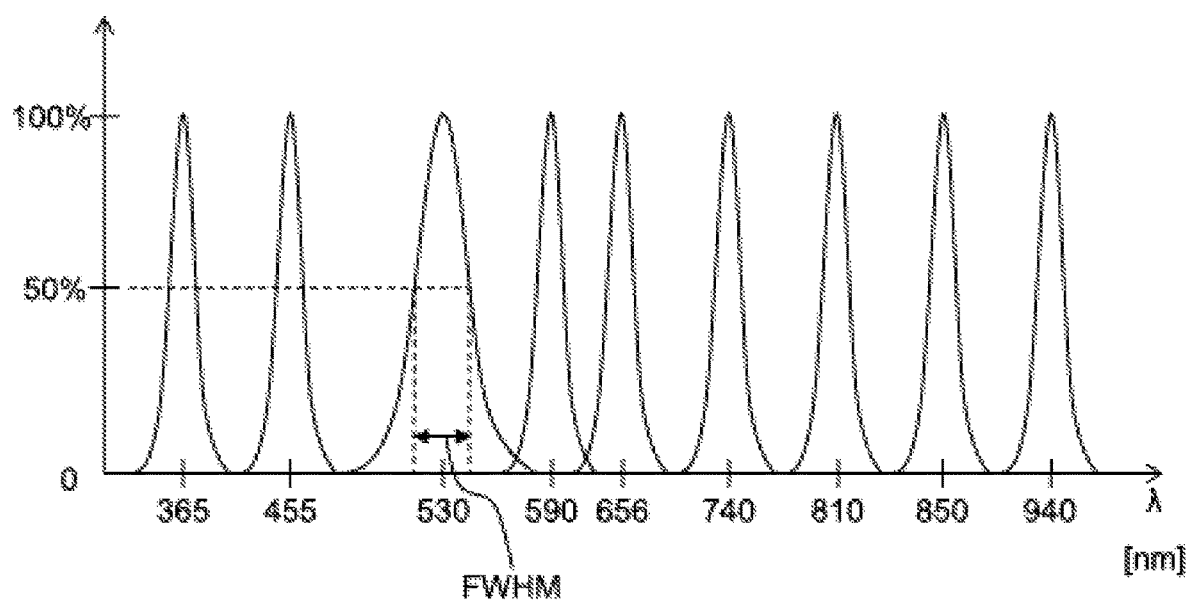
FIG. 4 shows an exemplary diagram of a plurality of emission spectra.

FIG. 4 shows an exemplary diagram of a plurality of emission spectra which are emitted, for example, from an illumination unit 120 (see FIG. 1, 2, 5 or 6) which has a total of nine different light-emitting diodes. The vertical axis shows the intensity I, wherein a respective spectrum is shown standardized to the maximum at 100%. By way of example, the wavelengths in nm of the maximum of the emission spectrum of one respective light-emitting diode are specified on the horizontal axis. For example, at 365 nm several surface-active substances, as are contained in detergents, can be identified. For example, at 455 nm glucose (sugar) can be identified. For example, at 530 nm, 590 nm, 656 nm, 740 nm and 810 nm several dyes or pigments can be identified. For example, at 850 nm proteins can be identified. For example, at 940 nm fats can be identified.

On the spectrum, the maximum thereof being at 530 nm, the full width at half maximum FWHM is shown by way of example, which is the width of the curve at 50% intensity. The emission spectra shown in this example represent examples of narrow-band spectra. It should be mentioned that the spectra shown are merely to be understood by way of example and that the exact shape of one respective spectrum depends on the light source and on the filters used.

The illumination unit 120 comprises, for example, a multi-color light-emitting diode which is designed to emit at least three different emission spectra, preferably one in the blue spectral range (400-500 nm), one in the green spectral range (500-600 nm) and one in the red spectral range (600-700 nm). The illumination unit 120 preferably comprises in addition to the multi-color light-emitting diode at least one further light-emitting diode which emits an emission spectrum ranging between 800-1000 nm and/or ranging between 300-400 nm. Instead of the multi-color light-emitting diode, individual diodes can also be provided, as described above.

Figure 5:
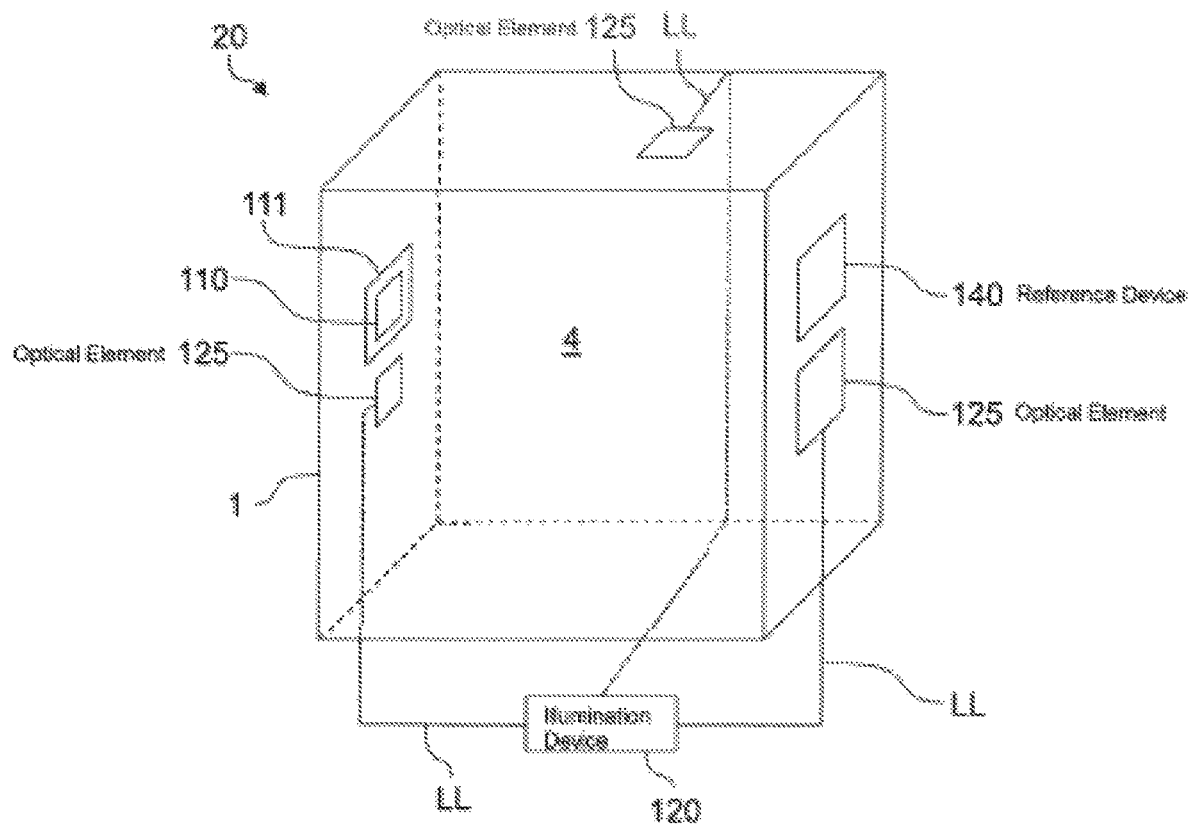
FIG. 5 shows a schematic perspective view of a further embodiment of a system comprising a dishwasher.

FIG. 5 shows a schematic perspective view of a further embodiment of a system 20 comprising a dishwasher 1. In this example, the illumination unit 120 is arranged in a machine housing (not shown) of the dishwasher 1. A plurality of light guides LL conduct the light generated by the illumination unit 120 to windows or lenses 125, the light being emitted therefrom into the washing chamber 4 and illuminating said washing chamber. The light guides LL and the lenses 125 are examples of optical elements. In this manner it is possible to achieve a very good illumination of the entire washing chamber 4, even if large items of washware, such as for example large pots or pans, cover some of the irradiation windows 125. Alternatively or additionally to such a distribution of the light by means of light guides LL, a plurality of illumination units 120 which are arranged at different points of the washing chamber 4 can be provided. The image capturing device 110 which in this example has an optical element 111, for example a wide angle lens, is arranged on the left-hand side of the washing chamber 4, so that the entire washing chamber 4 can be captured by the image capturing device 110. A control device 100 (see FIG. 1, 2 or 6) and an image analysis unit 130 (see FIG. 1, 2 or 6) are also present but, for reasons of clarity, are not shown in this FIG. 5.

A reference device 140 is arranged on the opposing side of the washing chamber 4. This reference device has a reference surface which entirely or almost entirely reflects the light emitted from the illumination unit 120 over the entire spectral range. Thus the brightness of the reference device 140 which is captured in the respective sub-images IMG1-IMG6 (see FIG. 3) can serve as a standardizing measure of the respective sub-image IMG1-IMG6.

As an alternative to such a reference device 140, the image analysis unit 130 (see FIG. 1, 2 or 6) can also be designed to undertake a self-consistent calibration by means of corresponding image processing algorithms. For example, clean surfaces of washware can be used as a reference surface. To this end, for example, it is ascertained that a specific image region which shows the surface of a plate (which has been ascertained, for example, by an object recognition) does not have any dark regions in the sub-images IMG1-IMG6 but has a uniform brightness. It can be concluded therefrom that this region is clean and thus is suitable as a reference surface.

Figure 6:
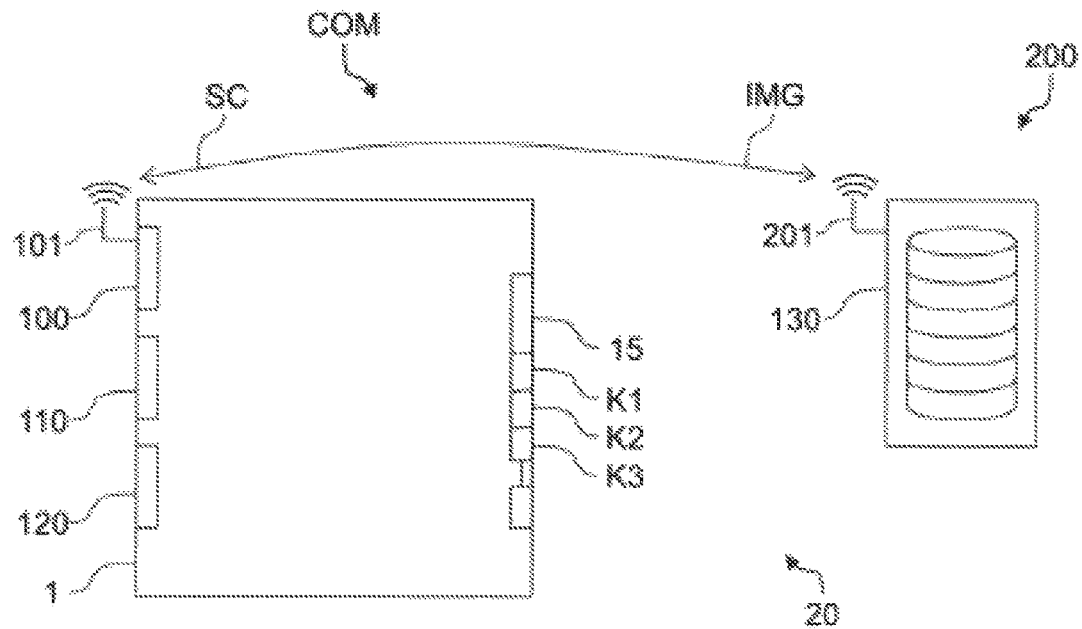
FIG. 6 shows a schematic view of a further embodiment of a system comprising a dishwasher.

FIG. 6 shows a schematic view of a further embodiment of a system 20 comprising a dishwasher 1. In this example, the image analysis unit 130 is arranged in an external device 200 which is configured here as a server. The dishwasher 1 and the server 200 have in each case a communication unit 101, 201 which are designed for establishing a communication connection COM for bidirectional communication. The communication unit 101 transmits the captured image IMG to the server 200 via this communication connection COM. The image analysis unit 130 in the server 200 carries out the chemical analysis using the received image IMG and on the basis of the encompassed sub-images IMG1-IMG6 (see FIG. 3) and transmits the ascertained dirt characteristic SC back to the dishwasher 1. Since the image analysis unit 130 is arranged in the server 200, a relatively high computing power is available for the image analysis and the chemical analysis, which is why more complex and/or more accurate analysis methods can be used, which can result in a more accurate dirt characteristic SC.

The dishwasher 1 also has in this example an automatic metering system 15 which has a plurality of chambers for separately receiving individual detergent components K1, K2, K3. The components K1, K2, K3 are, for example, an enzyme component K1, a bleach component K2, and a surfactant component K3, and the automatic metering system 15 is designed to mix a detergent mixture on the basis of the individual components K1, K2, K3 in any composition. The control device 100 ascertains, for example, an optimized detergent mixture as a function of the dirt characteristic SC and causes the automatic metering system 15 to provide this detergent mixture and to meter it into the washing chamber 4 at a predetermined metering time when carrying out the washing program.

Figure 7:
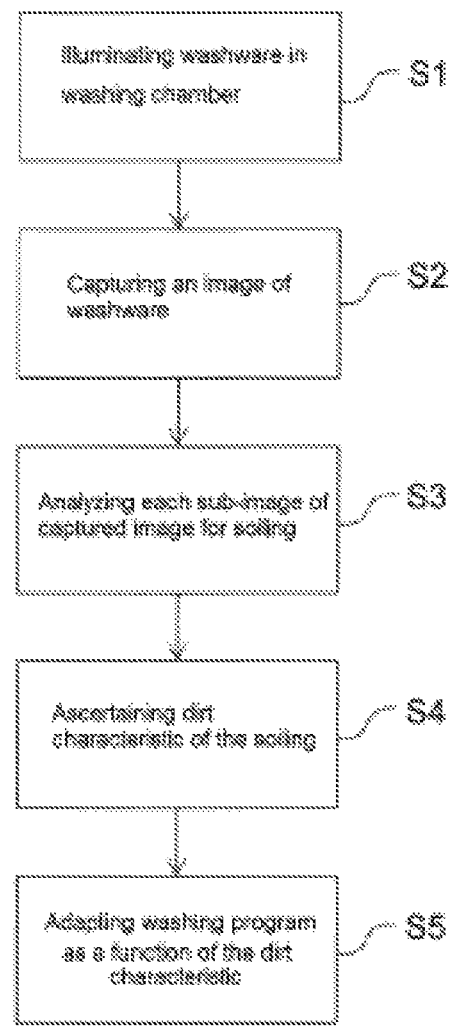
FIG. 7 shows schematic block diagram of an exemplary method for operating a dishwasher.

FIG. 7 shows a schematic block diagram of an exemplary method for operating a dishwasher 1, for example shown in FIG. 1, 5 or 6. The dishwasher has a control device 100 for carrying out a washing program for washing washware which can be arranged in a washing chamber 4 (see FIG. 1, 5 or 6). In a first step S1, the washware which is arranged in the washing chamber 4 is illuminated. In a second step S2, an image IMG (see FIG. 1, 2, 3 or 6) is captured of the washware which is arranged in the washing chamber 4 and which is illuminated, wherein the image IMG comprises a plurality of sub-images IMG1-IMG6 (see FIG. 3), each thereof having different spectral information on the washware. In a third step S3, each sub-image IMG1-IMG6 of the captured image IMG is analyzed, wherein a chemical analysis of a soiling of the washware is carried out. In a fourth step S4, a dirt characteristic of the soiling is ascertained on the basis of the chemical analysis. In a fifth step S5, the washing program for washing the washware is adapted as a function of the ascertained dirt characteristic SC.

This method or at least individual steps of the method can be repeated multiple times when carrying out the washing program in order to keep the dirt characteristic SC up to date.

For example, the method is carried out a first time at the start of the washing program. The image analysis unit 130 ascertains that the washware is heavily soiled, wherein the soiling consists of 20% fats, 50% carbohydrates and 30% proteins, wherein no moisture or detergent residues have been ascertained, which is output as a dirt characteristic SC. The control device 100 plans the washing program as a function of the dirt characteristic SC, wherein the washing program starts with a prewash with cold water. After ten minutes prewash, the method is carried out again in order to ascertain a current dirt characteristic SC. For example, it is ascertained that half of the carbohydrates and a third of the proteins have been washed off, so that it passes to the main wash. For the main wash, an optimized detergent mixture which has been ascertained on the basis of the current dirt characteristic SC by the control device 100 is added to the washing liquor. After 30 minutes main wash, the method is carried out again in order to ascertain a current dirt characteristic SC. It is ascertained that fats and proteins still adhere to the washware. The control device 100 ascertains a new optimized detergent mixture in order to release in a targeted manner the fats and proteins still present. After a further 20 minutes main wash, the method is carried out again and ascertains that soiling is no longer present on the washware, thus the washware is clean. However, detergent residues on the washware are captured, which is why rinsing with rinse aid takes place. After ten minutes rinsing with rinse aid, the method is carried out again, wherein it is ascertained that detergent residues are no longer present on the washware so that it passes to drying. After 30 minutes drying, the method is carried out again, wherein it is ascertained that residual moisture still adheres to the washware which is why the drying is continued. The method is carried out regularly, for example, until it is ascertained that the washware is dry, whereby the washing program is terminated.

Whilst the present invention has been described with reference to exemplary embodiments, it can be modified in many different ways.

The invention claimed is:

1. A system, comprising:
a dishwasher including a washing chamber;
an image capturing device designed to capture an image of washware arranged in the washing chamber, with the image comprising a plurality of sub-images, each of which having different spectral information of the washware;
an illumination unit designed to illuminate the washware in the washing chamber;
an image analysis unit designed to receive the captured image from the image capturing device and to carry out a chemical analysis of soiling on the washware based on the plurality of sub-images of the received image and to ascertain a dirt characteristic of soiling as a result of the chemical analysis; and
a control device designed to carry out a washing program for washing the washware in the washing chamber, said control device receiving the dirt characteristic from the image analysis unit and adapting the washing program for washing the washware as a function of the received dirt characteristic.

2. The system of claim 1, wherein the dishwasher is embodied as a household dishwasher.

3. The system of claim 1, wherein the image capturing device comprises a digital image sensor with a spectral sensitivity ranging from 360 nm-980 nm.

4. The system of claim 1, wherein the image capturing device comprises a digital image sensor with a spectral sensitivity ranging from 300 nm-1200 nm.

5. The system of claim 1, wherein the illumination unit is designed to emit selectively an emission spectrum from a plurality of different emission spectra.

6. The system of claim 1, wherein the illumination unit comprises a number of light-emitting diodes of different emission spectra.

7. The system of claim 1, wherein at least one of the illumination unit and the image capturing device includes at least one filter which is permeable only to a specific spectral range.

8. The system of claim 1, wherein at least one of the illumination unit and the image capturing device comprises a plurality of different filters which are permeable only to a specific spectral range.

9. The system of claim 1, wherein the illumination unit is designed to emit five, seven, eight, or nine, different emission spectra, with each of the emission spectra comprising a single maximum.

10. The system of claim 1, wherein the image capturing device comprises an optical device.

11. The system of claim 10, wherein the optical device is a wide angle lens.

12. The system of claim 1, further comprising an optical element designed to distribute light emitted by the illumination unit spatially in the washing chamber.

13. The system of claim 12, wherein the optical element comprises a lens, a light guide and/or a mirror.

14. The system of claim 1, further comprising a modulation device designed to control the illumination unit with an amplitude-modulated control signal, said image capturing device comprising a carrier frequency amplifier for capturing a respective one of the plurality of sub-images as a function of the control signal.

15. The system of claim 1, further comprising a reference device designed to provide a reference surface and arranged in the washing chamber, with a respective one of the plurality of sub-images being calibrated as a function of an intensity of the light reflected by the reference surface.

16. The system of claim 1, further comprising an external device designed to comprise the image analysis unit, the dishwasher and the external device each comprising a communication unit for bidirectional communication.

17. The system of claim 1, wherein the dirt characteristic comprises information about fats, proteins, carbohydrates, pigments, moisture and/or surface-active substances contained in the soiling.

18. The system of claim 1, wherein the control device is designed to ascertain an optimized detergent mixture as a function of the received dirt characteristic, and further comprising an automatic metering system designed to provide the optimized detergent mixture and to meter the optimized detergent mixture into a washing liquor used for washing the washware, wherein the detergent mixture comprises liquid and/or solid components, wherein the detergent mixture comprises an enzyme component, a surfactant component, a bleach component, a soap component and/or a rinse aid component.

19. A method for operating a dishwasher which comprises a control device for carrying out a washing program for washing washware in a washing chamber, the method comprising:
  illuminating the washware in the washing chamber;
  capturing an image of the washware in the washing chamber as the washware is illuminated, with the image comprising a plurality of sub-images of different spectral information of the washware;
  analyzing at least one of the plurality of sub-images of the captured image by carrying out at least a chemical analysis of a soiling of the washware;
  ascertaining a dirt characteristic of the soiling based on the chemical analysis, and
  adapting the washing program for washing the washware as a function of the ascertained dirt characteristic.

20. The method of claim 19 for operating a household dishwasher as the dishwasher.

* * * * *